US010164966B2

(12) United States Patent
Wilson (10) Patent No.: US 10,164,966 B2
(45) Date of Patent: Dec. 25, 2018

(54) DECOUPLING IDENTITY FROM DEVICES IN THE INTERNET OF THINGS

(71) Applicant: LOCKSTEP TECHNOLOGIES, Five Dock, New South Wales (AU)

(72) Inventor: Stephen Wilson, Five Dock (AU)

(73) Assignee: LOCKSTEP TECHNOLOGIES PTY LTD, Five Dock, NSW (AU)

(*) Notice: Subject to any disclaimer, the term of this patent is extended or adjusted under 35 U.S.C. 154(b) by 0 days.

(21) Appl. No.: 14/770,363

(22) PCT Filed: Feb. 24, 2014

(86) PCT No.: PCT/AU2014/000166
§ 371 (c)(1),
(2) Date: Aug. 25, 2015

(87) PCT Pub. No.: WO2014/127429
PCT Pub. Date: Aug. 28, 2014

(65) Prior Publication Data
US 2016/0006723 A1    Jan. 7, 2016

(30) Foreign Application Priority Data
Feb. 25, 2013    (AU) ............................... 2013900620

(51) Int. Cl.
*H04L 29/06*    (2006.01)
*H04L 9/32*    (2006.01)
(Continued)

(52) U.S. Cl.
CPC .......... *H04L 63/0823* (2013.01); *G06F 21/31* (2013.01); *G06F 21/34* (2013.01);
(Continued)

(58) Field of Classification Search
CPC ...................... H04L 2463/061; H04L 12/2803
See application file for complete search history.

(56) References Cited

U.S. PATENT DOCUMENTS

| 5,499,294 A | 3/1996 | Friedman |
| 8,347,101 B2 | 1/2013 | Wilson |
(Continued)

FOREIGN PATENT DOCUMENTS

| EP | 1072149 A1 | 1/2001 |
| WO | WO 00/49797 | 8/2000 |

OTHER PUBLICATIONS

International Search Report for International Application No. PCT/AU2014/000166 dated May 13, 2014, 3pp.

*Primary Examiner* — Josnel Jeudy
(74) *Attorney, Agent, or Firm* — Lewis Roca Rothgerber Christie LLP (57) ABSTRACT

This invention provides for data generated by intelligent devices exchanging information about their operation and performance over the so-called "Internet of Things" to be unidentified. Where particulars about an individual associated with a networked device are relevant to the operation and performance of the device, this invention provides for said particulars to be made available in digital certificates bound to the device. Data records generated by the device when operating with a certain individual are digitally signed at the time and later verified using said certificates, thus reliably conveying those particulars with the data. The identity of the individual is decoupled from the device and the data generated by the device.

11 Claims, 2 Drawing Sheets

(51) Int. Cl.
　　　*G06F 21/34*　　　(2013.01)
　　　*G06F 21/44*　　　(2013.01)
　　　*H04W 12/06*　　　(2009.01)
　　　*H04L 29/08*　　　(2006.01)
　　　*G06F 21/31*　　　(2013.01)
　　　*H04L 9/08*　　　(2006.01)

(52) U.S. Cl.
　　　CPC ............ *G06F 21/44* (2013.01); *H04L 9/0894* (2013.01); *H04L 9/3247* (2013.01); *H04L 9/3263* (2013.01); *H04L 63/04* (2013.01); *H04L 67/12* (2013.01); *H04W 12/06* (2013.01); *H04L 2209/84* (2013.01)

(56) References Cited

U.S. PATENT DOCUMENTS

| | | | |
|---|---|---|---|
| 8,832,805 B1* | 9/2014 | McGilliard | H04L 63/104 713/185 |
| 2003/0014372 A1* | 1/2003 | Wheeler | G06F 21/32 705/71 |
| 2003/0126432 A1 | 7/2003 | Tonisson | |
| 2008/0152146 A1* | 6/2008 | Conrado | G06F 21/10 380/278 |
| 2009/0113543 A1* | 4/2009 | Adams | G06F 21/33 726/18 |
| 2010/0304759 A1* | 12/2010 | Leppanen | H04L 69/325 455/456.2 |
| 2011/0103586 A1* | 5/2011 | Nobre | H04L 63/0853 380/270 |
| 2011/0126004 A1* | 5/2011 | Kawana | H04L 41/28 713/156 |
| 2011/0282168 A1* | 11/2011 | Weiss | A61B 5/742 600/323 |
| 2012/0084554 A1* | 4/2012 | Van Gorp | H04L 63/0428 713/150 |
| 2012/0278634 A1* | 11/2012 | Luukkala | H04L 63/0442 713/189 |
| 2012/0316726 A1* | 12/2012 | Schroeck | H04L 67/125 701/32.7 |
| 2013/0116597 A1* | 5/2013 | Rudge | A61B 5/150358 600/575 |
| 2014/0074721 A1* | 3/2014 | Al-Herz | G06Q 30/06 705/71 |

\* cited by examiner

DECOUPLING IDENTITY FROM DEVICES IN THE INTERNET OF THINGS

This invention relates to the problem of maintaining privacy in a highly interconnected environment where "intelligent" devices are increasingly networked together and gathering and exchanging data about what they are doing. This invention decouples the identity of individuals associated with such devices from the devices so that data collected and exchanged by the devices is not identified.

Note that the description of the invention herein assumes that the reader is familiar with public key cryptography and the meaning of terms including Public Key infrastructure, digital signature, public key certificate, digital certificate, Certification Authority and Certificate Policy.

CROSS-REFERENCE TO RELATED APPLICATIONS

The present application is a National Phase Patent Application and claims priority of International Application Number PCT/AU2014/000166, filed 24 Feb. 2014, which claims priority from Australian Provisional Patent Application No. 2013900620 filed on 25 Feb. 2013, the contents of which are incorporated herein by reference.

TECHNICAL FIELD

The present invention relates to the privacy, authenticity and integrity of data transmitted from intelligent networked devices operating in an electronic environment that may be referred to as the "Internet of Things". In particular the present invention relates to improving the privacy of such data transmissions by not identifying them while retaining strong assurance of selected data pertaining to the users or operators of such intelligent devices.

REFERENCES

Buer et al "Authentication and verification within a digital camera architecture" European Patent EP 1072149.
Friedman "Digital camera with apparatus for authentication of images produced from an image file" U.S. Pat. No. 5,499,294.
Wilson "System and method for anonymously indexing electronic record systems" U.S. Pat. No. 8,347,101.

BACKGROUND

The "Internet of Things" describes the increasing levels of electronic interconnectedness, computing power and autonomy of behavior featured in everyday objects. Devices tend more commonly to be called "intelligent" or "smart", reflecting built-in computational abilities that allow them to control their own behavior in response to environmental changes as well as (or instead of) user controls. Such devices typically log relatively large amounts of data, and transmit that data to other places for processing, to help monitor and improve performance.

Current and predicted examples of "intelligent" and interconnected devices include:
- medical monitoring equipment in the home that receives data from medical devices, biological sensors and/or implants, and forwards the data to physicians, hospitals, device companies, researchers and so on;
- wrist-worn activity trackers, with the ability to transfer logged health data to a user's computer, and to the manufacturer's servers for analysis; one example is the "Fuel Band" marketed by Nike Inc.;
- the whole category of "wearable computing" including clothing made of "smart fabrics" with built-in sensors for health, sports and/or safety and the ability to alter their fabric's properties in response to feedback, as well as "smart watches" with built-in computer and Bluetooth connectivity as envisaged in this press report: http://bits.blogs.nytimes.com/2013/02/10/disruptions-apple-is-said-to-be-developing-a-curved-glass-smart-watch;
- utilities "smart meters" which measure and digitize consumption of electricity and/or gas and/or water in a household at intervals of just a few minutes, and share that information with utilities companies and regulators, service providers, information brokers, and suitably enabled domestic appliances connected over Home Area Networks (HANs);
- "smart" appliances are rapidly emerging on the market which offer enhanced functionality for home owners through autonomous operation and interconnectivity over local networks and/or the Internet; examples include the "smart" smoke detector and thermostat of Nest Inc. reported by Wired Magazine in 2013: http://www.wired.com/business/2013/10/nest-smoke-detector/all;
- augmented reality eye glasses, an example of which is the "Google Glass", which is reportedly able to continuously monitor the wearer's surroundings by video, apply object and face recognition, and provide rich real-time information to the wearer via acoustic speakers and/or a visual heads-up display;
- automobiles with "black box data recorders" to monitor speed, location, engine functions and so on, for use in analysis of accidents or of routine performance; data recorders have been widespread in American vehicles for several years; recently the US Senate passed bill 1813 that would mandate the inclusion of data recorders in American made cars (see http://www.gpo.gov/fdsys/pkg/BILLS-112s1813es/pdf/BILLS-112s1813es.pdf); these developments arouse privacy concerns because personally identifiable information can be associated with the data recordings
- networked cars that communicate with one another and/or a base station over wireless networks for many possible purposes such as tracking and scheduling hire cars, tracing driver movements for calculating variable "pay as you drive" insurance premiums, exchanging information about driver ability, and to help avoid collisions in real time; one report playfully described a future "Internet of cars" http://www.wired.com/opinion/2013/01/forget-the-internet-of-things-here-comes-the-internet-of-cars;
- fully autonomous vehicles that can navigate for themselves with the assistance of geolocation information and real time image processing to make sense of the immediate surroundings; "driverless" cars have received limited regulatory approval in California: http//www.leginfo.ca.gov/pub/11-12/bill/sen/sb1251-1300/sb1298bill20120223introduced html;
- "smart cities" are being designed with widespread instrumentation of the built environment to help enhance energy distribution and efficiency, traffic management, roads maintenance and so on.

Tensions arise around these sorts of technologies between the need for high integrity and authenticity of data, and the need to preserve privacy of users. The Collection Limitation Principle in international privacy regimes holds that personally identifiable information should not be collected unless necessary for an explicit purpose. Therefore data generated by the sorts of networked devices described above should as a rule not be identified unless necessary. Moreover, re-identification of data by linking to third party datasets is an increasing privacy threat (see for example Latanya Sweeney "Simple Demographics Often Identify People Uniquely", Carnegie Mellon University, Data Privacy Working Paper 3, Pittsburgh 2000). Therefore it is becoming ever more imperative that information disclosed in routine transactions relating even indirectly to people be kept to a minimum. Whenever identity is not relevant, users should where possible be assigned impersonal identifiers or pseudonyms, and data pertaining to the users indexed by those identifiers or pseudonyms. In general, by using different identifiers or pseudonyms in different contexts, it becomes more difficult for third parties to re-identify users, because data sets are harder to link.

The present invention addresses the need to decouple personal information about a person associated with a networked device from data originating from that device. The present invention provides high integrity and authenticity of data in "machine-to-machine" interactions and the "Internet of Things" while minimizing the disclosure of personally identifiable information.

Prior Art

The present invention makes use of Public Key Certificates containing limited information relating to the user or operator of an intelligent device.

A Public Key Certificate (also known in the background art as a Digital Certificate) generally contains a copy of the certificate subject's details together with a cryptographic Public Key. Said Public Key corresponds mathematically to a Private Key which is stored securely in a device controlled by the certificate subject. The Public Key Certificate is digitally signed by an issuing authority generally referred to as a Certification Authority. Public Key Certificates usually contain additional administrative data such as cryptographic specifications to indicate compatibility with software that would make use of the certificate, validity periods, serial numbers, terms & conditions (or references to terms & conditions) and so on. Infrastructure comprising hardware, software, managed services, personnel, policy documents and administrative processes is required to manage the issuance, distribution, integration, verification and renewal of Public Key Certificates. Such infrastructure is generally known as Public Key Infrastructure (PKI).

The aforementioned characteristics of Public Key Certificates and PKI will be familiar to those skilled in computer security. It will be particularly familiar to those skilled in the art that Public Key Certificates may be configured in a variety of ways, containing different sorts of details, and that PKI may be assembled in different ways, with Public Key Certificate management functions being carried out by different sorts of organisation. Certain Certification Authorities provide means to customise Public Key Certificates to contain different sorts of details. It is also possible for organisations to procure security software and hardware with which they can issue customised Public Key Certificates for their own purpose and applications.

There exists a range of cryptographic algorithms, well known in security literature, based on diverse mathematical operations with which PKI systems may be built. Examples include the RSA algorithm based on the factorization of large integers, and elliptic curve cryptography based on discrete logarithms. The present invention may be embodied using these or other public key algorithms. Those skilled in cryptography will appreciate that continuous research and development occasionally leads to novel public key algorithms, and that the search for new algorithms continues in part because of the possibility that currently popular approaches may one day be obsolete. In addition to algorithms such as RSA and elliptic curve cryptography, the present invention will be compatible with future public key algorithms as yet undiscovered provided such future algorithms exhibit the essential asymmetry in which a Private Key value cannot be feasibly derived from knowledge of the corresponding Public Key.

We now recite aspects of the prior art known to us and relevant to understanding the improvements brought about by the present invention.

S. Wilson "System and method for anonymously indexing electronic record systems" U.S. Pat. No. 8,347,101 (hereinafter referred to as "Wilson") describes how to use anonymous Public Key Certificates to bind a record system pointer to a portable storage device such as a smartcard under the control of an individual. Wilson provides for anonymous indexing of records such as electronic health records when the individual is present at the time of the records being created and by unlocking their smartcard consents to be represented in the records. The present invention addresses the more general problem of privacy of data produced automatically by intelligent and networked devices, by arranging for Public Key Certificates containing limited information to be associated directly with the intelligent device.

The present invention is particularly concerned what may be called "embedded" cryptographic functions in intelligent devices; that is, functions involving cryptographic keys stored within the device and invoked automatically by the device (through programmed or hard wired logic) to perform security operations such as authentication. There is abundant prior art describing embedded cryptographic functions in devices such as digital cameras; see for example Friedman (U.S. Pat. No. 5,499,294), Buer et al (European Patent EP 1072149) and J. Kelsey, B. Schneier and C. Hall "An Authenticated Camera" in Proceedings of 12th Annual Computer Security Applications Conference, 1996.

Digital signature functions are included in some commercial digital cameras; see for instance http://cpn.canon-europe.com/content/education/infobank/image verification/canon data verification system.do and http://imaging.nikon.com/lineup/software/imag auth.

The aforementioned patent specifications and academic paper all describe digital signatures on photographs being produced by a digital camera. Buer et al discloses that a public/private key pair is generated when a digital camera is manufactured, and the public key is recorded by a Certification Authority so that the public key may later he used to authenticate a photograph produced by a particular camera. Public Key Certificates described in the digital camera prior art are used to disseminate reliable copies of public keys corresponding to private keys that generate digital signatures, so that those digital signatures may he verified to evince the authenticity of the signed photograph. However, Public Key Certificates described in the digital camera prior art do not provide for conveying selected particulars about the photographer. In contrast the present invention provides for a photographer controlling a digital camera to have selected particulars about themselves represented in a Public Key Certificate associated with a Private Key held in the camera and for those particulars to be reliably bound via digital signature to the photographs produced by the camera, without necessarily disclosing any other identifying information.

Embedded authentication functions are becoming increasingly widespread in intelligent devices. The advent of the Internet of Things has driven the development and deployment of general purpose security elements suitable for embedding in the manufacture of many different sorts of devices. An exemplar is the "Machine-to-Machine Identification Module" (MIM) which is based on the long standing Subscriber Identification Module (SIM) integrated circuit familiar in mobile telecommunications. MIMs typically include the ability to store one or more private keys associated with Public Key Certificates, and to create digital signatures using those private keys.

SUMMARY OF THE INVENTION

The present invention makes use of the widespread embedded cryptographic functionality of intelligent devices as canvassed above to create a strong binding between the device and particulars pertaining to the user or operator of said device during their operation of the device without revealing the identity of the user or operator. In particular, the present invention uses a Public Key Certificate to hold particulars about said user or operator, where the Public Key Certificate is associated with a Private Key securely accessed by the intelligent device, and the invention creates Digital Signatures on data generated by the intelligent device. The Public Key Certificates are issued within a Public Key Infrastructure (PKI) featuring a Root Public Key in keeping with conventional PKI practices. Any party with access to said Root Public Key is able to process said Digital Signatures and as a result attain a high degree of confidence that the digitally signed data originated from a certain intelligent device and that the data pertains to a certain user of the device with particulars contained in the Public Key Certificate, without any other information about the user being disclosed.

Said Private Key may he securely stored in a number of alternate ways depending on the design of the intelligent device and its mode of use. For example, some types of intelligent device will have an integrated cryptographic module such as a MIM suitable for holding and utilizing one or more Private Keys and/or performing cryptographic processing with said Private Keys. Further types of intelligent device, for example and without limitation an implantable medical device, will have cryptographic processing capabilities and key storage as an inherent part of the device design. Other types of intelligent device may be able to interface to a removable key storage medium such as a smartcard, a modified USB memory stick, a mobile phone, a wearable computer or a modified car key, allowing unidentified information to be handled about multiple users that might be in control of or otherwise associated with the same intelligent device from time to time.

According to a first aspect the present invention provides a method for securely associating information about the user of a networked device with data produced by said device, the method comprising:
securely storing a cryptographic Private Key in association with said device, and
creating a Public Key Certificate corresponding to said Private Key, the Public Key Certificate containing information about said user, and the Public Key Certificate being signed by or on behalf of an organization attesting to the information;
whereby at a time said device produces data about the operation of the device with said user, that data is digitally signed using said Private Key.

According to a second aspect the present invention provides a Machine-to-Machine Identification Module for securely associating information about the user of a networked device with data produced by said device, said Module:
being installed within or in association with said networked device, and
including secure storage of a cryptographic Private Key;
wherein at a time said device produces data about its operation with said user, that data can he digitally signed using said Module and Private Key, and whereby the data may later be authenticated using a Public Key Certificate corresponding to said Private Key, the Public Key Certificate containing particulars about the user and signed by or on behalf of an organisation attesting to the particulars.

According to a third aspect the present invention provides a secure personal key store for conveying particulars about a user operating a networked device, said key store:
holding a Private Key of the user, and
interfacing with a data processing sub-system of said networked device;
wherein at a time said data processing sub-system produces a record about the networked device being operated by said user, that record can be digitally signed using said Private Key, and whereby the signed record may later be authenticated using a Public Key Certificate corresponding to said Private Key, the Public Key Certificate containing particulars about the user and signed by or on behalf of an organization attesting to the particulars.

The networked device may be a medical device, a medical monitor, a vehicle, a drone, a road toll tag, a sensor in the built environment, a measuring instrument, a Breathalyzer, an RFID tag, a digital camera, a sound recorder, a utilities "smart meter", a domestic appliance, a robot, a 3D printer, a digital wallet, a wearable computer, an article of "smart clothing", a telephone, a time piece, or eye glasses. The cryptographic key store may be integral to one of a range of compact electronic devices including a MIM, a SIM, a mobile phone Secure Element, a car key, an RFID tag, a smartcard, a tablet computer, or a mobile phone. The cryptographic key store may interface to the data processing sub-system of said networked device either by contact and contactless means.

According to a fourth aspect the present invention provides a computer program element comprising computer program code means to make a networked device execute a procedure for effecting secure production of records about the operation of the networked device with a certain user, the computer program element comprising:
computer program means for causing a Private Key associated with a user to sign a record produced by the networked device, and
computer program means for verifying the signed record using a Public Key Certificate corresponding to said Private Key, the Public Key Certificate containing particulars of said user and being signed by or on behalf of an organization with dependable knowledge of the user.

According to a fifth aspect the present invention provides a method for securely associating particulars about the user of a networked device with records generated by said device, the method comprising:

securely storing a cryptographic Private Key associated with said device, binding particulars about said user to a Public Key which corresponds to said Private Key, at a time said device generates a record about its operation with said user, said record is cryptographically transformed by said Private Key, and at a later time applying said Public Key to the transformed record thereby verifying that the record and said bound particulars both relate to the operation of said device with said user.

DESCRIPTION OF THE PREFERRED EMBODIMENTS

Figure 1:
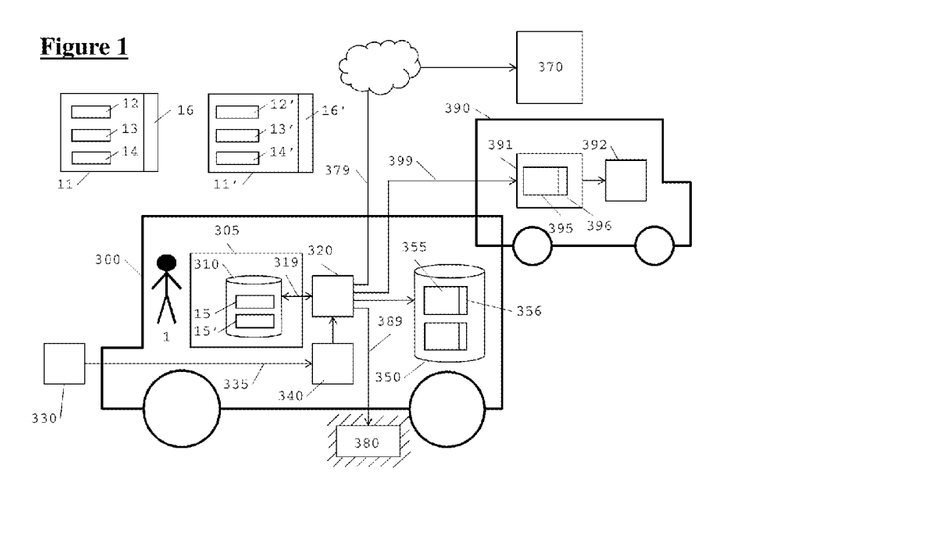
FIG. 1 illustrates the invention embodied in a networked car producing data for respectively a black box data recorder, the car's manufacturer, other vehicles and sensors in the traffic infrastructure.

The present invention may be used in a preferred embodiment to secure data produced by an electronically networked car operating in a network of similarly capable vehicles and sensors. With reference to FIG. 1, a networked car 300 includes without limitation signal processing sub-system 340, cryptographic processor 320 and "black box data recorder" 350. Data about the operation or performance of the car is collected by instrumentation 330 and sent over an interconnection 335 to the data processing sub-system 340. The instrumentation 330 could be integral to the car or alternatively could be located external to the car. Said instrumentation could he used without limitation to measure velocity, acceleration, distance, mass, pressure, location, time, proximity, temperature, sound, images, vibration, safety system status, engine performance, level of fuel, water or other consumables, drive train performance, driver behavior, passenger behavior, cargo properties and so on. Those skilled in the design of motor vehicles and related electronics will appreciate that such instrumentation may he realised in many alternative ways consisting of one or more components and sub-systems. The elements shown in FIG. 1 as instrumentation 330, interconnection 335 and signal processing 340 may be realised using additional elements not shown without affecting the essential nature of the present invention.

An individual 1 (who could be a driver, a passenger, a car owner or other person) associated with the car 300 is in control of a cryptographic Private Key 15 securely held in a key store 310 contained within a convenient physical housing 305. Said Private Key may be invoked by cryptographic processor 320 through an interconnection 319 and Application Programming Interface (API, not shown) with the key store 310. Private Key 15 corresponds to a Public Key 14 where the Private and Public Keys are specifically related to each other through an asymmetric algorithm. A Public Key Certificate 11 signed 16 by a Certification Authority (not shown in FIG. 1) contains without limitation the Public Key 14, particulars 12 about the individual 1, and a code value 13 that designates the intended application of said Public Key Certificate. Said Public Key Certificate may be anonymous or pseudonymous insofar as no identifying information is contained therein about individual 1.

In a preferred embodiment said particulars 12 include a driver license number of the individual 1. In an especially preferred embodiment the particulars 12 include indication of driver licensing conditions specific to the individual 1. The code value 13 may be used to prescribe the sort of car or network environment in which the Public Key Certificate 11 is intended to be used. Those skilled in Public Key Infrastructure (PKI) will be familiar with the "Certificate Policy Object Identifier" and similar mechanisms which are used to join a defined set of Public Key Certificates to documented rules pertaining to the PM. In a preferred embodiment of the present invention, the code value 13 equates to an X.500 Object Identifier for the Certificate Policy under which Public Key Certificate 11 was issued.

In an alternative embodiment the key store 15 is a cellular communications module and the housing 305 is part of the design of the car. In a different alternative embodiment the key store 15 is implemented by way of a microchip and the housing 305 is a car key. In a further alternative embodiment the housing 305 is a smartcard such as a driver license, and the interconnection 319 is effected by a smartcard reader. In another alternative embodiment the key store 310 is provided by a mobile telephone, the housing 305 is said telephone, and the interconnection 319 is effected by radio transmission or by a docking station. In yet another alternative embodiment the housing 305 is an RFID tag and the interconnection 319 is by radio transmission.

With further reference to FIG. 1, when data of interest 355 is to be recorded for some purpose relating to the operation of the car 300 in association with individual 1, the data is digitally signed 356 by cryptographic processor 320 using the Private Key 15. Certain such data is shown in FIG. 1 stored in data recorder 350. The purpose of creating digital signature 356 using Private Key 15 is to bind signed data 355 to particulars 12 of the individual 1 without revealing other personal information about that individual. The present invention provides that digitally signed data produced by the car 300 may be readily authenticated by any interested party using conventional PKI and digital signature processing techniques. The digital signature 356 can be verified relative to the Public Key Certificate 11, and said certificate can in turn be verified relative to a Root Public Key (not shown) associated with the issuer of the certificate. The manner in which said interested party obtains the Public Key Certificate 11 is not important to the present invention. It is possible for instance that a copy of Public Key Certificate 11 is stored within the car 300 and that further copies (not shown) of said Certificate accompany digitally signed data records. Said PKI and digital signature processing techniques will be familiar to those skilled in cryptography. Such successful verification of data digitally signed by the Private Key 15 provides a high degree of assurance that said data originated from a car under the control of an individual with particulars 12 set out in the Public Key Certificate 11 without revealing any other information about said individual. The identity of individual 1 is decoupled from said data relating to the operation of the car 300 under the control of that individual yet said data is rendered highly reliable by virtue of the digital signature. In particular said data is reliably bound via the digital signature mechanism both to the hardware 305 containing the Private Key 15 and to the particulars 12 of the individual contained in the Public Key Certificate 11.

Particulars of note vary from one application to another. The present invention allows different unidentified particulars about an individual to be bound to different data records to suit the needs of respective applications, said binding being achieved by creating one or more additional Public Key Certificates, each containing particulars of note to applications associated with respective certificates. For example and without limitation the particulars to be bound to data recorded by a black box data recorder might be a pseudonymous customer code assigned when an individual owner takes possession of car 300 and where said customer code is contained in Public Key Certificate 11.

Still referring to FIG. 1 for another example and without limitation, data 395 is transmitted 399 to another intelligent vehicle 390 and used by a logic system 392 to control aspects of the operation of other vehicle 390. Before transmission said data 395 is bound by digital signature 396 to particulars 12' relevant to the other vehicle 390, said particulars being contained in another Public Key Certificate 11' together with a Public Key 14' matched to a Private Key 15' used to create digital signature 396. FIG. 1 shows Private Key 15' held in the same store 310 and housing 305 as other Private Key 15. However it will be appreciated by those skilled in public key security techniques that Private Keys 15 and 15' could be held in different stores and interfaced to cryptographic processor in a variety of ways not shown without affecting the efficacy of the present invention. It will be further appreciated that program logic within cryptographic processor 320 can determine the most appropriate Private Key to use for digitally signing particular data according to this invention, said logic drawing for example and without limitation on the code values 13 and 13' in Public Key Certificates 11 and 11' respectively.

Said other vehicle 390 has a cryptographic processor 391 (with which digitally signed data 395 may be verified after being received from car 300) and onboard computer logic 392 for effecting changes to said other vehicle in response to verified information so received. For example and without limitation confidential information about the license conditions of the driver of car 300 can be contained as particulars 12' in Public Key Certificate 11', verified by cryptographic processor 391, and used by the logic system 392 as part of a calculation of a preferred path for vehicle 390 relative to car 300.

It is to be expected that communications between intelligent cars will typically involve two way transmission of data. For simplicity the embodiments of the present invention described herein only substantially describe one way communications from a first car 300 to a second vehicle 390. It will be appreciated by people skilled in automotive telematics that additional communications will typically occur without affecting the efficacy of the present invention. Such additional communications from second vehicle 390 back to first car 300 may indeed make use of the present invention in order to beneficially de-identify the driver of second vehicle 390.

In addition to or instead of the data applications described above concerning a black box data recorder and another intelligent vehicle, the present invention may be used to de-identify data about a networked car sent to organisations for processing. FIG. 1 further illustrates data being transmitted 379 via the Internet from car 300 to an organisation 370, and/or to an environmental monitor 380 via radio link 389. Further for example and without limitation the organisation 370 can be a car manufacturer receiving performance data for the purposes of product monitoring and improvement. Alternatively the organisation 370 can be a security service receiving status information about a car of interest, or an insurance company monitoring driving history about a certain insurance policy holder.

The act of verifying that certain digitally signed data produced by the car 300 is bound to an individual's particulars 12 or 12' may be performed in real time immediately after receiving said data, as for instance in the case of another intelligent vehicle 390 interacting with the car 300. Alternatively the verification of the binding of digitally signed data from car 300 to other particulars in Public Key Certificates not shown but similar to certificates 11 and 11' may be performed offline and at essentially any future time, as for example at an environmental monitor 380 or an organisation 370.

To summarise: FIG. 1 illustrates how the present invention may be used to decouple the identity of an individual from different pieces of data about that individual in relation to the functioning of a networked car. For convenience FIG. 1 shows example applications of data being stored in a black box data recorder, transmitted to another intelligent vehicle, transmitted to an environmental monitor, and transmitted to an organisation. It is to be understood that any or all of these applications may be present in the one car and that the present invention may be used independently in any or all of them.

Figure 2:
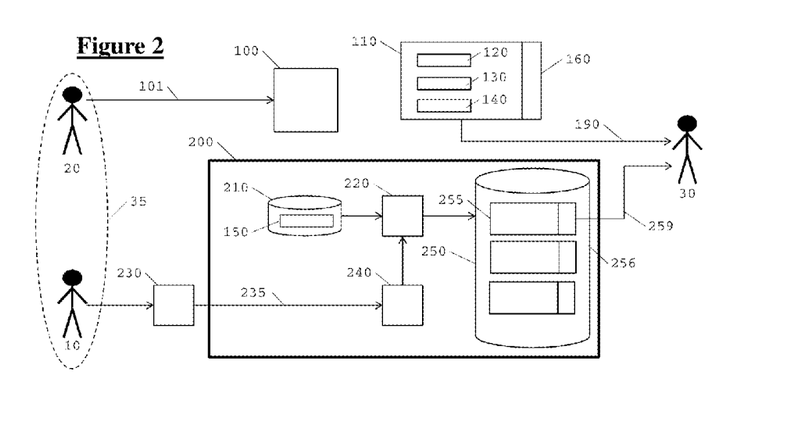
FIG. 2 illustrates the invention embodied in a medical home monitor transmitting confidential patient information to a third party.

The present invention may be used in an alternative preferred embodiment to de-identify data produced by a medical home monitor and transmitted to third parties such as medical specialists, medical device companies, researchers and regulators. Medical monitoring base stations are generally in widespread use for improving the management of patients with pacemakers, implantable defibrillators, insulin pumps and other medical equipment. Medical monitoring base stations are also used to handle the measurement, logging and transmission of healthcare statistics such as vital signs, blood pressure, electrocardiograms, weight, body temperature, and levels of certain hormones or biomarkers. The description here of the present invention embodied in a monitoring base station does not limit or constrain in any way the clinical functionality of such equipment nor does the embodiment affect any other security features that such medical equipment may employ such as encryption, access control, backup or archiving.

With reference to FIG. 2, a patient 10 has in their home a monitoring base station 200 for the purpose of receiving data from a medical device 230. After processing said data in data processing subsystem 240, the data is recorded in a store 250 and made available at a later time to a third party 20.

An authoriser 20 such as a doctor with a relationship with patient 10 associates said patient with a Patient Identifier 120. The authoriser 20 communicates 101 with a Certification Authority 100 which creates Public Key Certificate 110 with the effect of binding the Patient Identifier 120 to the base station 200, as follows. Key generation means not illustrated produces Public Key 140 and corresponding Private Key 150. The Private Key 150 is stored in a secure memory 210 within (or associated with) the base station 200. A copy of said Public Key 140 is contained within a Public Key Certificate 110 together with patient identifier 120, a code value 130 and other administrative data not illustrated such as, without limitation, validity date information, serial numbers, address information and so on, said administrative data being used to support the orderly running of the Public Key Infrastructure of the Certification Authority 100. The Public Key Certificate 110 bears the digital signature 160 of the Certification Authority 100.

In a particularly preferred embodiment secure memory 210 is part of a Machine-to-Machine Identification Module (MIM). In an alternative embodiment secure memory 210 is part of a Trusted Platform Module (TPM).

Information received by base station 200 from medical device 230 is subject to processing in sub-system 240 to render an intelligible data record 255. Said data record is digitally signed by cryptographic processor 220 using the Private Key 150. At a later time, third party 30 receives via link 259 from the base station 200 a data record 255 and digital signature 256. Using Public Key Certificate 110 and standard Public Key Infrastructure elements not shown, said third party is able to verify that digital signature 256 corresponds to the Private Key 150 that is known to be held in the secure store 210 of base station 200. Said third party is further able to verify that digital signature 256 corresponds via Public Key Certificate 110 to the patient identifier 120. Thus the present invention allows for data records pertaining to a certain patient known only by their patient identifier to be verified as originating from a medical device and base station of that same patient without revealing any other information about said patient. The present invention results in improved privacy by decoupling the true identity of the patient from their base station and thus minimizing disclosure of extraneous identifying information during the course of collecting medical information.

In a particularly preferred embodiment the Public Key Certificate 110 includes a Code Value 130 to indicate that said Certificate has been issued for authenticating data as originating from a specific class of devices such as base station 200. The Code Value 130 may confirm to Relying Parties such as third party 30 and others not shown that a data record 255 must have originated from a certain type of device, on the basis that only Public Key Certificates bearing that code value are issued to the type of device by the Certification Authority 100.

In alternative embodiments particulars pertaining to patient 10 other than their patient identifier may be contained in Public Key Certificate 110 instead of patient identifier 120. For example and without limitation said particulars might be a pseudonym, an avatar, biometric data, a biometric template, demographic data, a code value specific to the patient's medical equipment, or a medical record number.

In alternative embodiments the secure memory 210 and cryptographic processor 220 need not be physically located within the base station 200 but instead can be located remotely and accessed by some secure electronic means, without affecting the efficacy of the present invention. It may for example he convenient and cost effective to locate the secure memory and cryptographic processor in what is colloquially called "the cloud" meaning some secure data centre (not shown) that provides security functions as a service to the base station 200 and third party 30. In a further alternative embodiment, secure memory 210 and cryptographic processor 220 may be contained within a personal storage device of the patient 10 such as a healthcare smartcard, a mobile phone or a wearable computer which connects with base station 200 via a standard contact or contactless interface. In a further alternative embodiment the entire monitoring base station 200 may be integrated into one miniature device such as a wristband, a Holter monitor, an implantable, a tag, a tattoo, or a pill.

Figure 3:
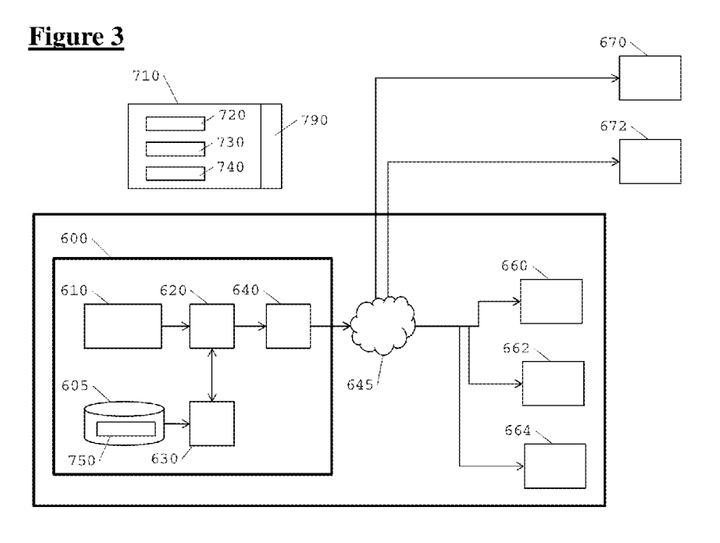
FIG. 3 illustrates the invention embodied in a "smart" smoke detector transmitting data to other devices on a home area network as well as to parties outside the home.

FIG. 3 shows how the present invention may be used in an alternative preferred embodiment to render private the data produced by a "smart" smoke detector and transmitted to other devices on a home network and to third parties such as manufacturers and monitoring services.

Smoke alarm unit 600 has within it a smoke sensor 610, signal and data processing sub-system 620, cryptographic processor 630 and networking interface 640. Associated with the smoke alarm is a key store 605 containing an asymmetric cryptographic Private Key 750 corresponding to a Public Key 740. It will be appreciated that smoke detectors typically include other sub-systems such as power supplies and annunciators which are not significant for the purposes of the present embodiment and which are omitted from the current description and drawing in the interests of clarity. Data generated by the smoke alarm 600 may be digitally signed by cryptographic processor 630 before being transmitted over a network 645 to one or more other systems and parties including without limitation a home network base station 660, other home appliance 662, home network controller 664, a manufacturer 670 or a monitoring service 672.

In a preferred embodiment, when a customer obtains the smoke detector, a Public Key Certificate 710 is created which includes (without limitation) said Public Key 740, administrative information 720 and selected particulars 730 about the customer. Public Key Certificate 710 is signed 790 by or on behalf of an organisation (not shown) trusted to vouch for the particulars and administrative information Said administrative information may include without limitation the smoke alarm manufacturer details, the smoke alarm's regulatory status, accreditation numbers, standards numbers, and/or a customer reference number. In an alternative preferred embodiment, at the time the "smart" smoke detector is bound to the home network controller 664, an additional Public/Private Key pair (not shown) may be generated and another Public Key Certificate created containing other customer particulars pertinent to monitoring the use of the equipment. A particular beneficial outcome of the present invention in this embodiment is that data digitally signed using Private Key 750 and transmitted from the smoke alarm 600 to other systems and parties may be verified by said systems and parties using Public Key Certificate 710 which reliably reveals particulars about the smoke alarm and the customer but does not reveal any extraneous personal information. The anonymity furnished by the present invention is a powerful tool for managing information in the "Internet of Things" while protecting peoples' privacy.

It will be appreciated by those knowledgeable about "smart" appliances and home area networking that the present invention may be embodied in alternate appliances so as to effect private and secure communications about the operation of those appliances. Examples of appliances include without limitation televisions, media players, radios, e-books, kitchen appliances, thermostats, furnaces, air conditioners, pool pumps, washers and dryers. The sorts of data to be measured and transmitted can include power consumption, environmental conditions, images, sounds, appliance settings, history of appliance usage, and the condition of the appliance.

The present invention may be used to decouple the identity of users and operators from networked devices so that only select particulars of those users or operators are contained in data records generated by those devices. In alternative embodiments said particulars may be any of the following: a name, a license number, license conditions, license grade, a registration number, age, qualifications, an identifier, an government identity number, an avatar, a pseudonym, a nickname, a "handle", an account number, an insurance policy number, a claim number, a Customer Reference Number, an employee number, a membership number, a health identifier, a medical record number, a clinical trial code, medical conditions, a bar code, a QR code, a meaningless but unique number, biometric data, a biometric template, demographic data, age, location data, or a post code. The present invention also allows information about a "smart" device to be bound by digital signature to data generated by the device, said device information possibly including model type, model number, region code, date of manufacture, date of test, data of audit, accreditation status, accreditation number, standard number, a quality mark, or other device specific data. The present invention is applicable to a wide range of networked devices incorporating cryptographic processing including the examples described herein as well as games consoles, toys, luggage, luggage tags, traffic management appliances, smart grid sub-systems, speed cameras, medical imaging equipment, special purpose instrumentation, and gym equipment.

It will be appreciated by persons skilled in the art that numerous variations and/or modifications may be made to the invention described in the specific embodiments disclosed herein without departing from the spirit or scope of the invention as broadly described. It will be appreciated that the invention may be constructed using a variety of alternate but standard components for the software functionality without materially affecting the efficacy of the invention in respect of de-identifying data generated by networked devices in the "Internet of Things".

The invention claimed is:

1. A method for securely associating information about a user of a networked medical monitoring device with records generated by said medical monitoring device, the method comprising:
   transmitting, by an authorized network device, select information of a user to a certification authority, over a computer network;
   generating a private key and public key pair;
   receiving a data record about operation of said medical monitoring device by said user, from a plurality of biological sensors or an implanted medical device, said data record including one or more of vital signs, blood pressure, electrocardiograms, weight, body temperature, and levels of certain hormones or biomarkers;
   securely storing the private key in a secure memory of said medical monitoring device of the user;
   transmitting the public key to the certification authority, over said computer network;
   generating, by the certification authority, a public key certificate associated with the user to bind a user pseudonym to the medical monitoring device, wherein the public key certificate is anonymous or pseudonymous to decouple personal information of the user from the data record and includes selected anonymous information of the user and the public key;
   digitally signing, by the medical monitoring device, the data record with the private key;
   receiving over said computer network and by a third party network device, the digitally signed data record and the public key certificate; and
   verifying, by the third party network device, the digitally signed data record with the public key certificate to verify that the public key certificate corresponds to the user pseudonym and the data record originated from the medical monitoring device, wherein based on successfully verifying the data record, the third party network device associates the data record with the select information of the user to decouple the identity of the user from the medical monitoring device.

2. The method of claim 1 wherein the select information of the user includes a pseudonym.

3. The method of claim 1 wherein the select information of the user includes a customer reference number.

4. The method of claim 1 wherein the select information of the user includes biometric data.

5. The method of claim 1 wherein the select information of the user includes a government issued identifier.

6. The method of claim 1 wherein the select information of the user includes demographic information.

7. The method of claim 1 wherein the private key is stored in a smartcard used with the medical monitoring device.

8. The method of claim 1 wherein the select information of the user is a clinical trial code.

9. The method according to claim 1 further comprising:
   determining, by the authorized network device, device information of the medical monitoring device of the user; and
   sending, by the authorized network device, device information of the medical monitoring device to the certification authority,
   wherein the public key certificate associated with the user includes device information of the medical monitoring device of the user.

10. The method according to claim 1 further comprising:
   generating, by the authorized network device, a unique number, handle, pseudonym or nickname without personally identifiable information,
   wherein the select information of the user comprises one or more of a unique number, handle, pseudonym or nickname without personally identifiable information.

11. The method according to claim 1 wherein the select information of the user includes one or more pieces of medical information of the user.

* * * * *